(12) United States Patent
Jeong et al.

(10) Patent No.: US 8,334,941 B2
(45) Date of Patent: Dec. 18, 2012

(54) LIQUID CRYSTAL DISPLAY

(75) Inventors: Wee-Joon Jeong, Seoul (KR); Tae-Hyung Kim, Suwon-si (KR); Ki-Hong Song, Cheonan-si (KR); Young-Suk Ha, Uiwang-si (KR); Jin-Woo Park, Cheonan-si (KR); Min-Soo Choi, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 767 days.

(21) Appl. No.: 12/406,882

(22) Filed: Mar. 18, 2009

(65) Prior Publication Data
US 2009/0262276 A1 Oct. 22, 2009

(30) Foreign Application Priority Data
Apr. 21, 2008 (KR) .................. 10-2008-0036724

(51) Int. Cl.
*G02F 1/1333* (2006.01)
(52) U.S. Cl. ........................................... 349/58
(58) Field of Classification Search ............... 349/58
See application file for complete search history.

(56) References Cited

U.S. PATENT DOCUMENTS

| | | | |
|---|---|---|---|
| 7,667,789 B2* | 2/2010 | Choi et al. | 349/65 |
| 7,880,828 B2* | 2/2011 | Shin et al. | 349/58 |
| 2008/0084520 A1* | 4/2008 | Nam et al. | 349/65 |
| 2008/0245949 A1* | 10/2008 | Morimoto et al. | 250/205 |
| 2009/0135115 A1* | 5/2009 | Sakamoto et al. | 345/84 |
| 2009/0180050 A1* | 7/2009 | Lee et al. | 349/58 |

FOREIGN PATENT DOCUMENTS

| | | |
|---|---|---|
| JP | 2007148177 A | 6/2007 |
| KR | 1020050037832 A | 4/2005 |
| KR | 1020070025052 A | 3/2007 |
| KR | 1020070072188 A | 7/2007 |

* cited by examiner

*Primary Examiner* — Sarah Hahm
(74) *Attorney, Agent, or Firm* — Cantor Colburn LLP

(57) ABSTRACT

A liquid crystal display ("LCD") includes; a lower receiving container which includes; a bottom plate, sidewalls extending from the bottom plate, a first through-hole formed in the bottom plate, and a guide pole disposed on the bottom plate and which substantially surrounds the first through-hole, a plurality of light sources disposed within the lower receiving container; an optical sensor printed circuit board ("PCB") attached to a bottom surface of the bottom plate, wherein the optical sensor printed circuit board covers the first through-hole, and an optical sensor mounted on the optical sensor PCB and inserted into the first through-hole.

28 Claims, 16 Drawing Sheets

LIQUID CRYSTAL DISPLAY

This application claims priority to Korean Patent Application No. 10-2008-0036724, filed on Apr. 21, 2008, and all the benefits accruing therefrom under 35 U.S.C. §119, the contents of which in its entirety are incorporated herein by reference.

BACKGROUND OF THE INVENTION

1. Field of the Invention

The present invention relates to a liquid crystal display ("LCD"), and more particularly, to an LCD which can accurately control the luminance and color of light.

2. Description of the Related Art

Liquid crystal displays ("LCDs") are one of the most widely used flat panel displays ("FPDs"). An LCD includes two substrates having electrodes formed thereon and a liquid crystal layer interposed between the two substrates. The LCD applies voltages to the electrodes to rearrange liquid crystal molecules of the liquid crystal layer and thus control the amount of light that passes through the liquid crystal layer.

Since an LCD is a passive light-emitting device, it includes a plurality of light sources that supply light to a liquid crystal panel. However, the amount of light emitted from the light sources may be reduced over time, and the luminance and color of light emitted from the light sources may also change over time. In this regard, research is being conducted on a method of controlling the luminance and color of light emitted from light sources by attaching an optical sensor to an LCD.

However, if an optical sensor is attached to a front surface of a liquid crystal panel, it may be undesirably visible to viewers. In addition, if external light is input to a portion of an LCD to which the optical sensor is attached or if light within the LCD is not accurately guided to the optical sensor, it may be difficult to accurately control the luminance and color of the light within the LCD.

BRIEF SUMMARY OF THE INVENTION

Aspects of the present invention provide a liquid crystal display ("LCD") which can accurately control the luminance and color of light. However, aspects of the present invention are not restricted to the one set forth herein. The above and other aspects and advantages of the present invention will become more apparent to one of ordinary skill in the art to which the present invention pertains by referencing the detailed description of the present invention given below.

According to an exemplary embodiment of the present invention, there is provided an LCD including; a lower receiving container which includes; a bottom plate, sidewalls extending from the bottom plate, a first through-hole formed in the bottom plate, and a guide pole disposed on the bottom plate and which substantially surrounds the first through-hole, a plurality of light sources disposed within the lower receiving container, an optical sensor printed circuit board ("PCB") attached to a bottom surface of the bottom plate, wherein the optical sensor printed circuit board covers the first through-hole; and an optical sensor mounted on the optical sensor PCB and inserted into the first through-hole.

According to another exemplary embodiment of the present invention, there is provided an LCD including; a lower receiving container which includes; a bottom plate having an embossing portion, sidewalls extending in a first direction from the bottom plate, and a first through-hole formed in the embossing portion, wherein the embossing portion protrudes from the bottom plate in a second direction substantially opposite to the first direction, a plurality of light sources disposed within the lower receiving container, an optical sensor PCB attached to the embossing portion, wherein the optical sensor printed circuit board covers the first through-hole within the lower receiving container, and an optical sensor mounted on the optical sensor PCB.

According to another exemplary embodiment of the present invention, there is provided an LCD including; a lower receiving container which includes; a bottom plate, sidewalls disposed on the bottom plate and which surround edges of the bottom plate, a first through-hole formed through the lower receiving container, a plurality of light sources disposed within the lower receiving container, an optical sensor PCB attached to a bottom surface of the bottom plate, wherein the optical sensor printed circuit board covers the first through-hole, an optical sensor mounted on the optical sensor PCB and inserted into the first through-hole, and a light-shielding film disposed under the bottom plate and which covers the optical sensor PCB.

According to another exemplary embodiment of the present invention, there is provided an LCD including; a lower receiving container which includes, a bottom plate, sidewalls extending from the bottom plate, a first through-hole formed in the bottom plate, and a guide pole disposed on the bottom plate and which substantially surrounds the first through-hole, a plurality of light sources disposed within the lower receiving container, an optical sensor printed circuit board attached to a bottom surface of the bottom plate, wherein the optical sensor printed circuit board covers the first through-hole, an optical sensor mounted on the optical sensor printed circuit board and inserted into the first through-hole, an alignment plate disposed on the bottom plate and which includes a second through-hole located at a position aligned with the first through-hole, and wherein an upper surface of the alignment plate extends further from the bottom plate than an upper surface of the guide pole.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
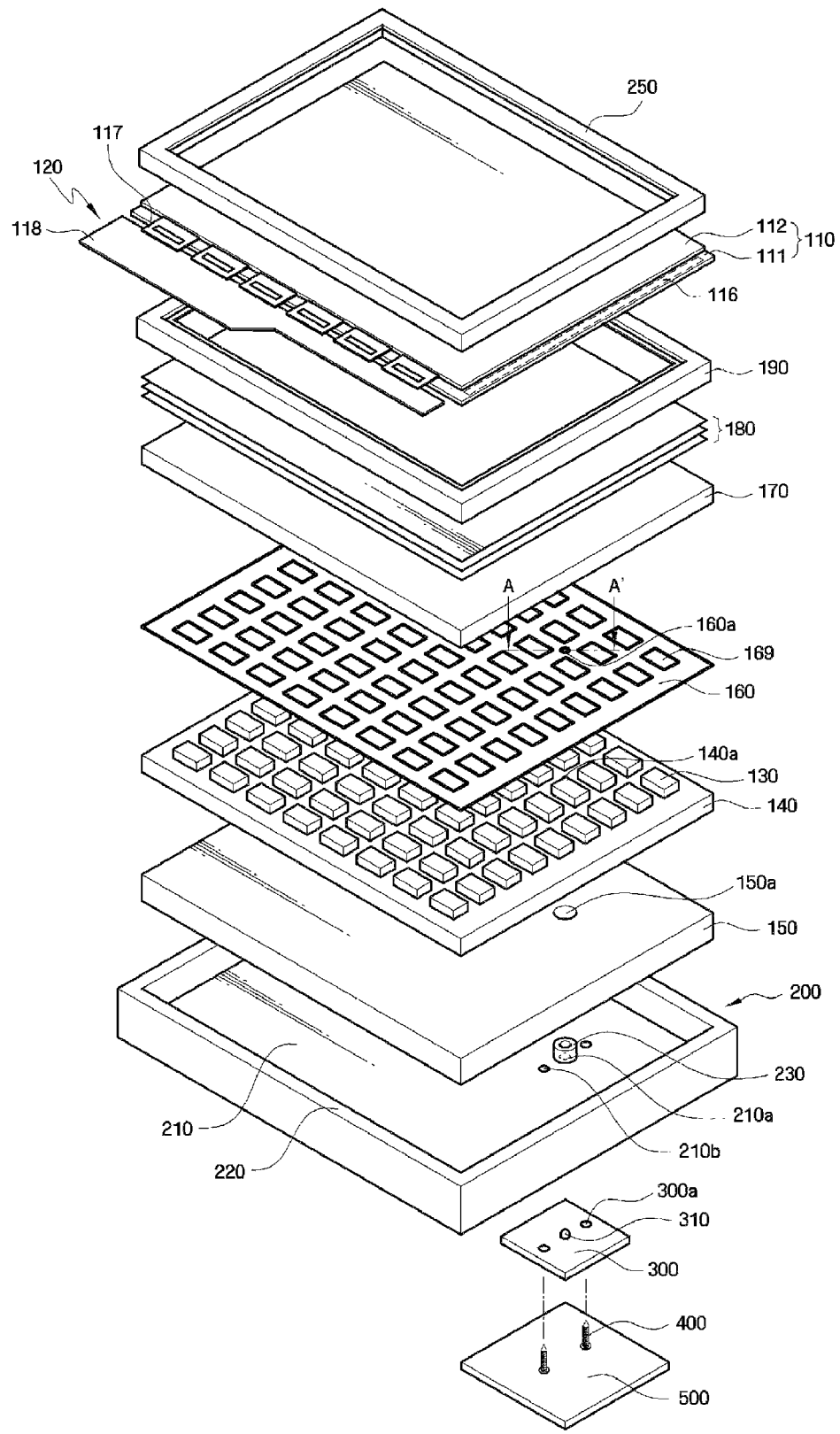
FIG. 1 is an exploded perspective view of a first exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements would then be oriented "above" the other elements. Thus, the exemplary term "below" or "beneath" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Throughout the specification, the term "upper" or "on" denotes a direction toward a viewer who views a liquid crystal display ("LCD"), and the term "lower" or "under" denotes a direction opposite to the direction toward the viewer.

Figure 2:
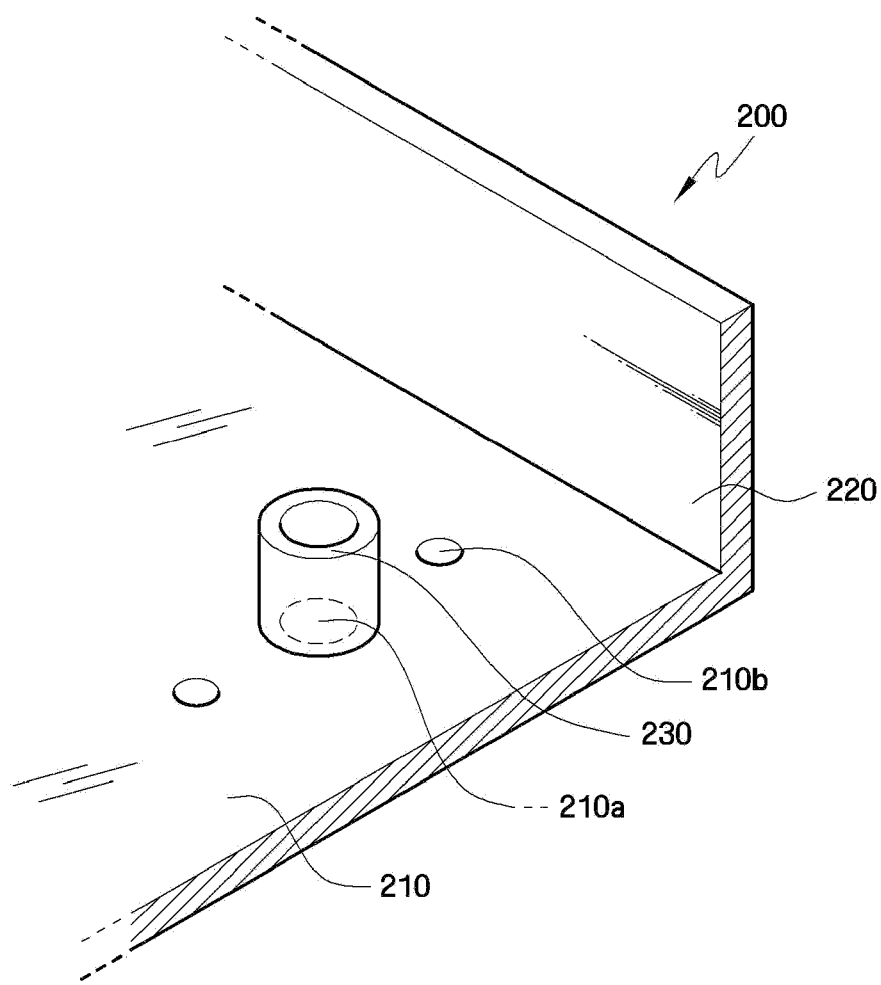
FIG. 2 is a partial perspective view of an exemplary embodiment of a lower receiving container included in the first exemplary embodiment of an LCD according to the present invention.
Figure 3:
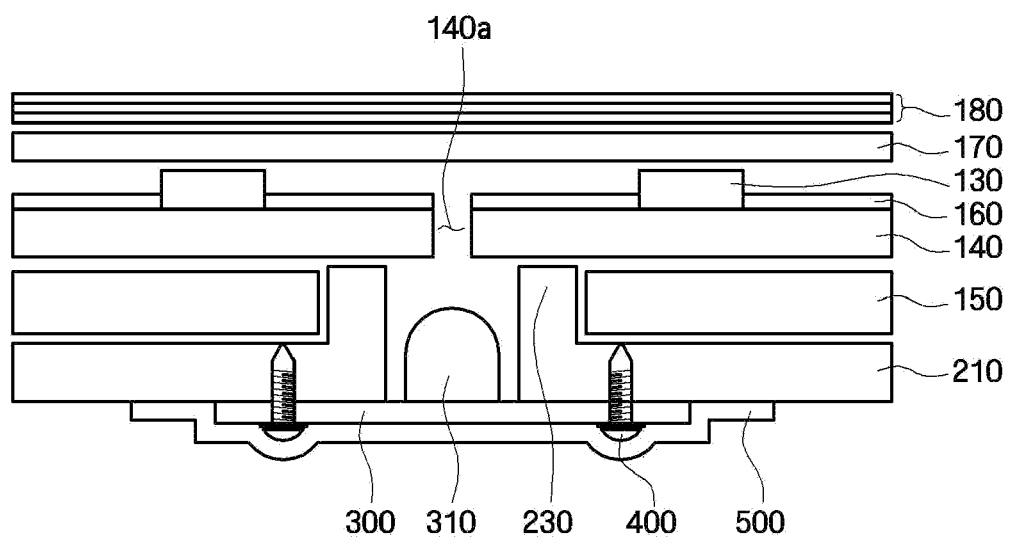
FIG. 3 is a cross-sectional view of the first exemplary embodiment of an LCD taken along line A-A' of FIG. 1.

Hereinafter, a first exemplary embodiment of an LCD according to the present invention will be described in detail with reference to FIGS. 1 through 3. FIG. 1 is an exploded perspective view of the first exemplary embodiment of an LCD according to the present invention. FIG. 2 is a partial perspective view of an exemplary embodiment of a lower receiving container 200 included in the first exemplary embodiment of an LCD according to the present invention. FIG. 3 is a cross-sectional view of the first exemplary embodiment of an LCD taken along line A-A' of FIG. 1.

Referring to FIG. 1, the present exemplary embodiment of an LCD includes a liquid crystal panel assembly 120 and a backlight. The present exemplary embodiment of an LCD may be a direct-type LCD in which a plurality of light sources 130 are disposed substantially parallel to a bottom plate 210 of a lower receiving container 200.

The liquid crystal panel assembly 120 includes a liquid crystal panel 110 which has a first substrate 111, a second substrate 112, and a polarizer (not shown) disposed on a surface of each of the first and second substrates 111 and 112, liquid crystals (not shown) disposed between the first and second substrates 111 and 112, a gate driving integrated circuit ("IC") 116, a data tape carrier package 117, and a printed circuit board ("PCB") 118.

The liquid crystal panel 110 includes the first substrate 111, the second substrate 112 which faces the first substrate 111, a polarizer which is disposed beneath the first substrate 111, and another polarizer which is disposed on the second substrate 112. The first substrate 111 includes gate lines (not shown), data lines (not shown), pixel electrodes, and other similar components. The second substrate 112 includes a black matrix, color filters, common electrodes, and other similar components. Exemplary embodiments include configurations wherein the color filters or the common electrodes may be disposed on the first substrate 111, depending on the type of the liquid crystal panel 110. Exemplary embodiments also include configurations wherein the polarizers are disposed interior to the first and second substrates.

The liquid crystal panel 110, in which the plate-shaped substrates described above are stacked, is placed in an intermediate receiving container 190 which will be described in more detail below.

The gate driving IC 116 is integrated onto the first substrate 111 and is connected to each gate line (not shown). The data tape carrier package 117 is connected to each data line (not shown) formed on the first substrate 111.

Various driving parts for processing a gate driving signal and a data driving signal may be mounted on the PCB 118. The driving parts may transmit the gate driving signal to the gate driving IC 116 and the data driving signal to the data tape carrier package 117.

The backlight assembly includes the light sources 130, an alignment plate 140, a reflective sheet 160, a diffusion plate 170, optical sheets 180, the intermediate receiving container 190, and the lower receiving container 200.

The light sources 130 included in the direct-type LCD according to the present exemplary embodiment may be a plurality of point light sources which are disposed to emit light toward the liquid crystal panel 110. The light sources 130 according to the present embodiment may be, but are not limited to, light-emitting diodes ("LEDs"). The light sources 130 may be LEDs, each emitting red light, green light or blue light, and light from the LEDs may be combined to emit white light to the liquid crystal panel 110.

In one exemplary embodiment, the light sources 130 may be arranged at regular intervals on the alignment plate 140 which is disposed above the bottom plate 210 of the lower receiving container 200. In one exemplary embodiment, the alignment plate 140 may be a light source-driving PCB which controls the luminance of LEDs by applying power to the LEDs. Alternative exemplary embodiments include configurations wherein a separate light source-driving PCB may be implemented independently of the arrangement plate 140. A first light transmission hole 140a may be formed in the alignment plate 140 to allow light emitted from the light sources 130 to reach an optical sensor 310.

A heat-radiating pad 150 is disposed under the alignment plate 140 and radiates heat emitted from the light sources 130 out of the LCD. In one exemplary embodiment, the heat-radiating pad 150 may be made of a thermally conductive material. When the heat-radiating pad 150 is disposed on the bottom plate 210 of the lower receiving container 200, which also may be chosen to have a good thermal conductivity, its heat-radiating effects can further be enhanced. A second through-hole 150a is formed in the heat-radiating pad 150, and a guide pole 230 of the lower receiving container 200, which will be described later, is inserted into the second through-hole 150a. The positional relationship between the heat-radiating pad 150 and the lower receiving container 200 will be described in detail later.

The reflective sheet 160 is disposed on the alignment plate 140, and a plurality of light source-exposing grooves 169, which expose the light sources 130, respectively, are formed in the reflective sheet 160. Exemplary embodiments of the reflective sheet 160 may be made of reflective materials, one exemplary embodiment of which is polyethylene terephthalate ("PET"). In one exemplary embodiment, a surface of the reflective sheet 160 may be coated with a diffusion layer which contains a light diffusing substance, one exemplary embodiment of which is titanium dioxide.

The reflective sheet 160 may be shaped like a flat sheet and reflects light emitted downward from the diffusion plate 170 upward. The reflective sheet 160 may have inclined surfaces at edges thereof in order to reduce the amount of light that is lost through absorption into the sides of the lower receiving container 200.

A second light transmission hole 160a is formed in the reflective sheet 160. The second light transmission hole 160a allows light emitted from the light sources 130 to be input to the optical sensor 310. The position of the second light transmission hole 160a will be described in detail later.

The diffusion plate 170 is disposed on the reflective sheet 160 and diffuses light emitted from the light sources 130 to enhance luminance uniformity of the light passing therethrough.

The optical sheets 180 are disposed on the diffusion plate 170. The optical sheets 180 diffuse and concentrate light emitted from the light sources 130 and passed through the diffusion plate 170. In one exemplary embodiment, the optical sheets 180 include a diffusion sheet, a first prism sheet, and a second prism sheet. In such an exemplary embodiment, the diffusion sheet is disposed on the diffusion plate 170 and enhances the luminance and luminance uniformity of light emitted from the light sources 130. The first and second prism sheets are disposed on the diffusion sheet and concentrate and output light diffused by the diffusion sheet. Exemplary embodiments include configurations wherein the second prism sheet may be omitted.

The intermediate receiving container 190 includes a support platform which supports the liquid crystal panel 110. The intermediate receiving container 190 is coupled to the lower receiving container 200 so as to press and fix the optical sheets 180 and the diffusion plate 170. In one exemplary embodiment, the intermediate receiving container 190 may be a mold frame. In such an exemplary embodiment, the mold frame may be made of a plastic material, to prevent parts fixed by the intermediate receiving container 190 from being damaged.

The lower receiving container 200 accommodates the light sources 130, the alignment plate 140, the heat-radiating pad 150, the reflective sheet 160, the diffusion plate 170, the optical sheets 180, and the other similar components. The shape of the lower receiving container 200 will be described in detail later.

According to the present exemplary embodiment, the optical sensor 310 is mounted on an optical sensor PCB 300 and fixed to a rear side of the lower receiving container 200. In the present exemplary embodiment, the optical sensor PCB 300 is fixed to the lower receiving container 200 by rotary coupling members 400, however alternative exemplary embodiments include alternative fixing means as would be apparent to one of ordinary skill in the art. A light-shielding film 500 is disposed on the rear side of the lower receiving container 200 to cover a rear surface of the optical sensor PCB 300. The optical sensor 310, the optical sensor PCB 300, and the light-shielding film 500 will be described in detail later.

Referring to FIGS. 1 and 2, the lower receiving container 200 includes the bottom plate 210, sidewalls 220, a first through-hole 210a formed in the bottom plate 210, and the guide pole 230.

The light sources 130, the alignment plate 140, the heat-radiating pad 150, the reflective sheet 160, the diffusion plate 170 and the optical sheets 180, are placed on the bottom plate 210 of the lower receiving container 200.

The sidewalls 220 of the lower receiving container 200 are formed extending from the bottom plate 210. The sidewalls 220 extend substantially vertically from the bottom plate 210 to prevent the above parts from moving out of the lower receiving container 200. In order to securely fix the above parts, each of the sidewalls 220 may be bent in a "U" shape.

The first through-hole 210a into which the optical sensor 310 is inserted is formed at one side of the bottom plate 210. In one exemplary embodiment, the first through-hole 210a may be formed between the light sources 130 in order not to overlap the light sources 130. In one exemplary embodiment, the first through-hole 210a may be formed in the center of the bottom plate 210. However, exemplary embodiments include configurations wherein the first through-hole 210a may be formed at any position as long as it allows the optical sensor 310 to sense light emitted from the light sources 130.

The first through-hole 210a may have a greater diameter than the optical sensor 310 so that the optical sensor 310 can be inserted into the first through-hole 210a. However, the diameter of the first through-hole 210a may be minimized to substantially equal to that of the optical sensor 310 in order to minimize light received from an external source.

The guide pole 230 is formed on the bottom plate 210 to surround the first through-hole 210. The guide pole 230 guides light emitted from the light sources 130 toward the optical sensor 310. Exemplary embodiments include configurations wherein the guide pole 230 may be a cylindrical pole or a hollow polygonal pole. However, it would be apparent to one of ordinary skill in the art that the guide pole 230 may have any shape as long as it has outer walls which can guide light toward the optical sensor 310 and is hollow to allow light to pass therethrough.

An upper receiving container 250 may be shaped like a frame having a window that exposes the liquid crystal panel 110 and may be coupled to the lower receiving container 200.

Referring to FIGS. 1 through 3, the guide pole 230 may extend further in the vertical direction than the optical sensor 310 to protect the optical sensor 310 and guide light toward the optical sensor 310. If the guide pole 230 is taller than the optical sensor 310, light that proceeds toward inner sidewalls of the guide pole 230 can be reflected by the inner walls and then input to the optical sensor 310. That is, the guide pole 230 can guide not only the light that proceeds directly toward the optical sensor 310 but also the light that proceeds toward the inner sidewalls of the guide pole 230 to the optical sensor 310. Consequently, the optical sensor 310 can detect the luminance and color coordinates of light more accurately.

A height of the guide pole 230 may correspond to a thickness of the heat-radiating pad 150. Accordingly, a top surface of the guide pole 230 may be level with that of the heat-radiating pad 150, and the parts, such as the alignment plate 140, which are mounted on the heat-radiating pad 150, may be disposed horizontally.

The first light transmission hole 140a of the alignment plate 140 may be aligned with the first through-hole 210a and may allow light emitted from the light sources 130 to be input to the optical sensor 310. Since the optical sensor 310 is not inserted into the first light transmission hole 140a, the shape and size of the first light transmission hole 140a may be configured to allow a minimum amount of light to pass therethrough. Thus, the first light transmission hole 140a may have a smaller diameter than the first through-hole 210a.

The second light transmission hole 160a is formed in the reflective sheet 160 to allow light to pass therethrough. The first light transmission hole 140a and the second light transmission hole 160a may overlap each other and, in one exemplary embodiment, may have a substantially equal diameter.

Since the first light transmission hole 140a and the first through-hole 210a overlap the second light transmission hole 160a and the second through-hole 150a, respectively, light emitted from the light sources 130 is delivered to the optical sensor 310. Specifically, light emitted from the light sources 130 reaches the liquid crystal panel 110 via the diffusion plate 170, the optical sheets 180 and other intermediary structures, and part of the light is reflected and delivered to the optical sensor 310 via the first light transmission hole 140a, the second light transmission hole 160a, the first through-hole 210a and the second through-hole 150a and the guide pole 230 or is delivered directly to the optical sensor 310 without first reflecting from the guide pole 230.

In one exemplary embodiment, the optical sensor 310 senses three types of light emitted from the light sources 130. That is, the optical sensor 310 collectively detects red light, green light and blue light emitted from the light sources 130 and uses the detected light to control the light emission of the light sources 130. Specifically, the optical sensor 310 compares the luminance and color coordinates of light received from the light sources 130 to reference values and sends the comparison results to a light source driving circuit (not shown), exemplary embodiments of which may include an inverter, in order to control the overall luminance and color properties of the LCD.

When light is incident onto the LCD from an external source, it is difficult for the optical sensor 310 to accurately control the overall luminance and color of the LCD. Therefore, the optical sensor PCB 300 having the optical sensor 310 mounted thereon is closely adhered to a rear surface of the bottom plate 210. If there is a gap between the optical sensor PCB 300 and the bottom plate 210, external light may be input to the gap. Therefore, the optical sensor PCB 300 and the bottom plate 210 may be fixed to each other by the rotary coupling members 400. Exemplary embodiments of the rotary coupling members include screws. To this end, first insertion grooves 300a are formed in the optical sensor PCB 300, and second insertion grooves 210b are formed in the bottom plate 210. Thus, the rotary coupling members 400 are coupled to the first and second insertion grooves 300a and 210b. In the present exemplary embodiment, the rotary coupling members 400 are coupled to the first and second insertion grooves 300a and 210b in a direction from the optical sensor PCB 300 toward the bottom plate 210.

Since the rotary coupling members 400 and the optical sensor PCB 300 are disposed under the lower receiving container 200, the heat-radiating pad 150 the alignment plate 140, and other components which are received in the lower receiving container 200 can remain horizontal. Thus, distortion of the parts can be prevented.

In one exemplary embodiment, in order to completely block light from an external source, the optical sensor PCB 300 may be covered by the light-shielding film 500. The light-shielding film 500 may be made of a material with light-shielding and insulating properties. The light-shielding film 500 is disposed under the bottom plate 210 of the lower receiving container 200 to completely cover the optical sensor PCB 300.

Figure 4:
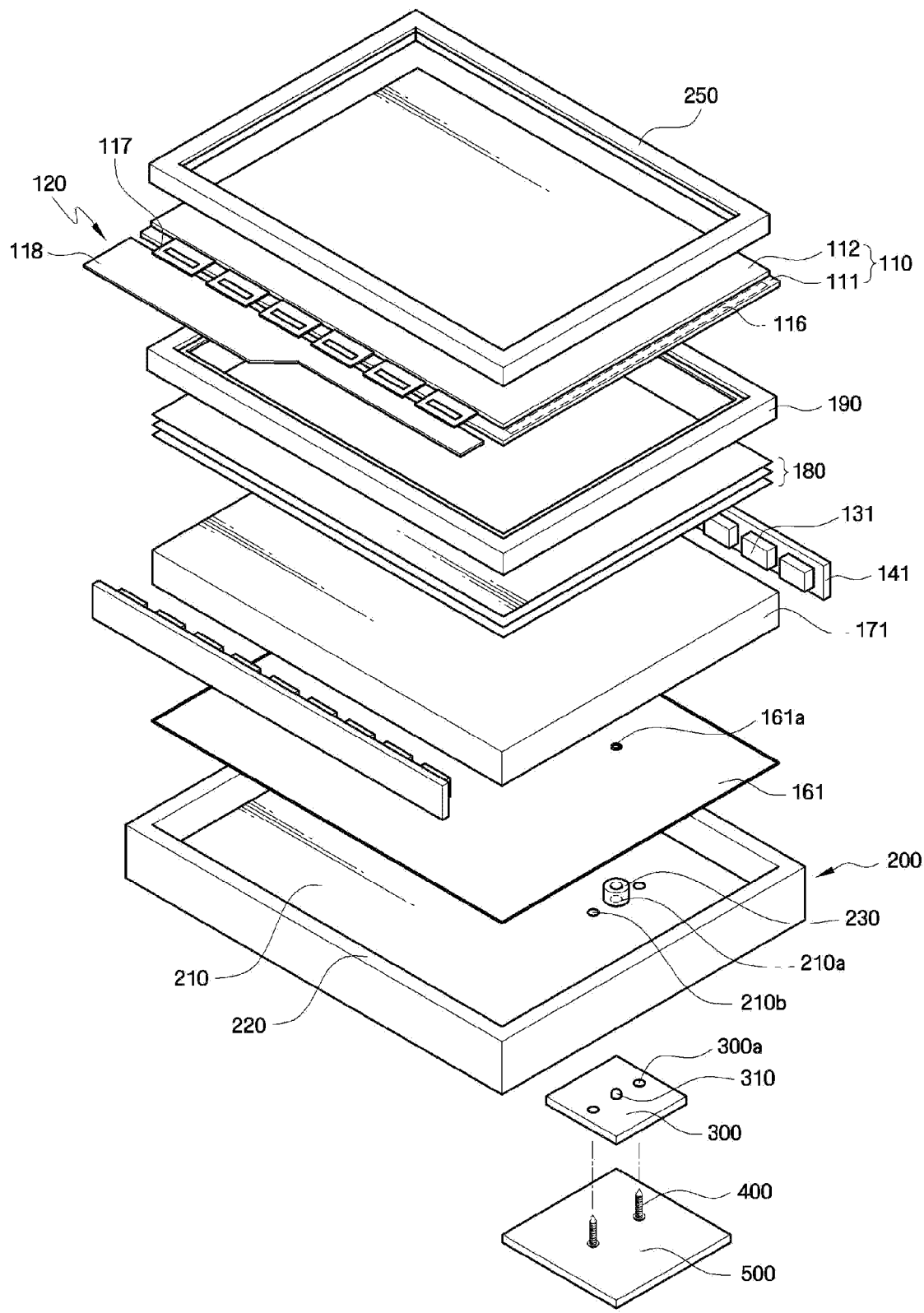
FIG. 4 is an exploded perspective view of a second exemplary embodiment of an LCD according to the present invention.

Hereinafter, a second exemplary embodiment of an LCD according to the present invention will be described in detail with reference to FIG. 4. FIG. 4 is an exploded perspective view of the second exemplary embodiment of an LCD according to the present invention. In the following exemplary embodiments, elements substantially identical to those of the first exemplary embodiment are indicated by like reference numerals, and thus their description will be omitted or simplified.

Referring to FIG. 4, the second exemplary embodiment of an LCD is an edge-type LCD in which a plurality of light sources 131 are disposed at one or more sides of the LCD. The second exemplary embodiment of an LCD according to the present embodiment includes a liquid crystal assembly 120 which is substantially identical to that of the first exemplary embodiment of an LCD and a backlight assembly which is partially different from that of the first exemplary embodiment of an LCD.

The backlight assembly according to the present exemplary embodiment includes the light sources 131, alignment plates 141, a reflective sheet 161, a light guide plate ("LGP") 171, optical sheets 180, an intermediate receiving container 190, and a lower receiving container 200.

The number of the light sources 131 included in the second exemplary embodiment of an LCD may be less than that of the number of light sources 130 included in the first exemplary embodiment of an LCD. Therefore, the amount of heat emitted from the light sources 131 may be reduced when compared to the first exemplary embodiment. For this reason, a heat-radiating pad may be omitted. However, a heat-radiating pad having a thickness that corresponds to a height of a guide pole 230 may be implemented in order to maintain the horizontal orientation of the reflective sheet 161.

Since the present exemplary embodiment of an LCD is of an edge type, the light sources 131 may be disposed at one or more sides of the LCD. The light sources 131 may be point light sources such as LEDs and may be arranged at regular intervals on each of the alignment plates 141. Specifically, the light sources 131 may be disposed on the alignment plates 141 on both sides of the LGP 171. Although not shown in the drawing, the light sources 131 may be electrically connected to an inverter (not shown), which supplies power, and thus receive power from the inverter. Alternative exemplary embodiments include configurations wherein the light sources 131 are disposed on only one side of the LGP 171.

The LGP 171 is received in the lower receiving container 200 such that the light sources 131 are disposed on both sides of the LGP 171. The LGP 171 may be made of a material with light-transmitting properties in order to efficiently guide light. In one exemplary embodiment, the LGP 171 may be made of acrylic resin such as polymethylmethacrylate ("PMMA") or a material with a fixed refractive index, such as polycarbonate ("PC").

Light which is incident on a side of the LGP 171 made of the above material has an angle that does not exceed a critical angle of the LGP 171. Thus, the light is delivered into the LGP 171. When light is incident on a top surface or a bottom surface of the LGP 171, it has an angle that exceeds the critical angle of the LGP 171. Thus, the light incident upon a side of the LGP 171 does not come out of the LGP 171 but is uniformly transmitted within the LGP 171 until it is incident upon a diffusion pattern (not shown), which may be formed on any one of the top surface and the bottom surface of the LGP 171. Thus, when the diffusion pattern is formed on, for example, the bottom surface of the LGP 171, guided light may be output upward at an angle smaller than the critical angle.

Alternative configurations of the present exemplary embodiment include configurations wherein a diffusion plate may be omitted. Instead, in such an alternative configuration one of the optical sheets 180 may perform the function of the diffusion plate.

Unlike in the first exemplary embodiment of the present invention, light source-exposing grooves are not formed in the reflective sheet 161 according to the present exemplary embodiment. A second light transmission hole 161a may be formed in the reflective sheet 161 to allow light to be directly input to an optical sensor 310. In this case, light emitted from the light sources 131 may reach the second light transmission hole 161a via the LGP 171 or via the reflective sheet 161, the optical sheets 180, and a liquid crystal panel 110. The light that passed through the second light transmission hole 161a is guided by the guide pole 230 to reach the optical sensor 310 which is inserted into a first through-hole 210a.

However, alternative exemplary embodiments from the exemplary embodiment illustrated in the drawing include configurations wherein the second light transmission hole 161a may not be formed in the reflective sheet 161. In such an alternative exemplary embodiment, light emitted from the light sources 131 may pass through the reflective sheet 161 via the LGP 171 and reach the optical sensor 310, e.g., the reflective sheet 161 may not entirely reflect all of the light incident thereon, but instead may allow a fraction of the light incident thereon to pass therethrough. Here, the intensity of the light that reaches the optical sensor 310 may be lower than that of the light that reaches the optical sensor 310 when the second light transmission hole 161a is formed in the reflective sheet 161. However, the optical sensor 310 may detect the luminance and color coordinates of the light by calibrating the luminance and color coordinates of the light with reference values stored therein.

The reflective sheet 161 according to the present exemplary embodiment may cover the bottom surface of the LGP 171 and the light sources 131 in order to reflect light, which is emitted from the bottom surface of the LGP 171 and sides of the lower receiving container 200, upward.

Figure 5:
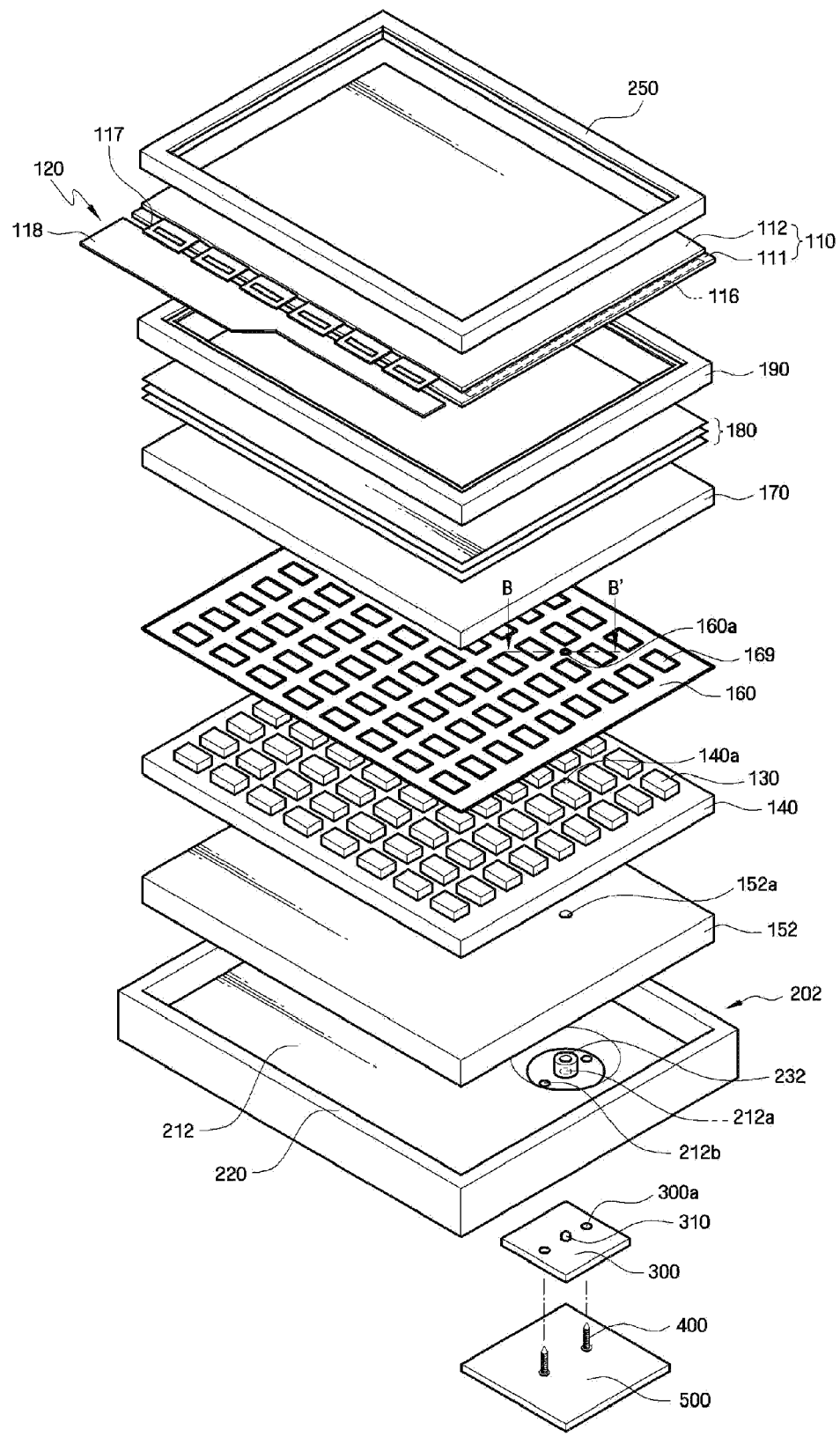
FIG. 5 is an exploded perspective view of a third exemplary embodiment of an LCD according to the present invention.
Figure 6:
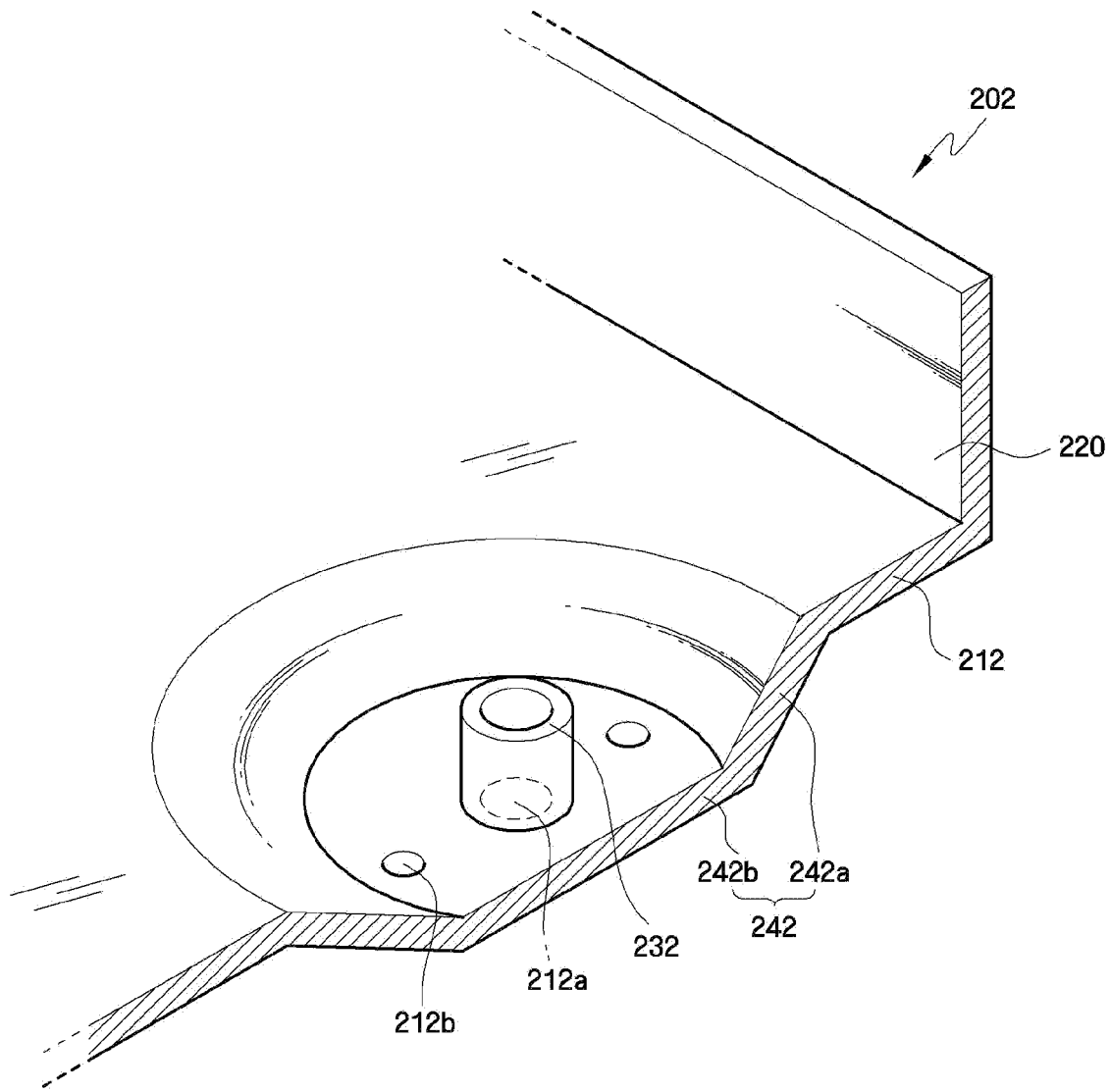
FIG. 6 is a partial perspective view of an exemplary embodiment of a lower receiving container included in the third exemplary embodiment of an LCD according to the present invention.
Figure 7:
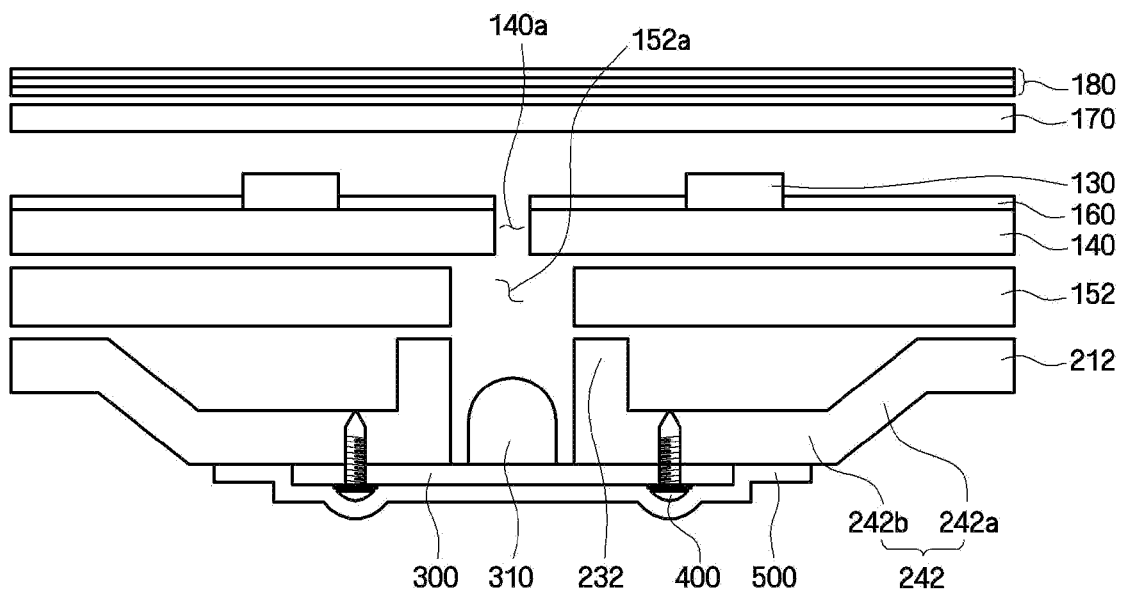
FIG. 7 is a cross-sectional view of the third exemplary embodiment of an LCD taken along line B-B' of FIG. 5.

Hereinafter, a third exemplary embodiment of an LCD according to the present invention will be described in detail with reference to FIGS. 5 through 7. FIG. 5 is an exploded perspective view of the third exemplary embodiment of an LCD according to the present invention. FIG. 6 is a partial perspective view of a lower receiving container 202 included in the third exemplary embodiment of an LCD according to the present invention. FIG. 7 is a cross-sectional view of the third exemplary embodiment of an LCD taken along line B-B' of FIG. 5.

Referring to FIGS. 5 and 6, the present exemplary embodiment of an LCD according is of a direct type, and the lower receiving container 202 includes an embossing portion 242 in a bottom plate 212 thereof.

The embossing portion 242 includes an inclined portion 242a which is formed by sloping part of the bottom plate 212 downward and a plate portion 242b which extends from the inclined portion 242a and has a flat surface substantially parallel to the bottom plate 212. In the present embodiment, a first through-hole 212a is formed in the plate portion 242b, and a guide pole 232 is formed to surround the first through-hole 212a. That is, in the present exemplary embodiment the guide pole 232 is formed on the plate portion 242b.

Referring to FIGS. 5 through 7, a height of the guide pole 232 may be substantially equal to a depth of the embossing portion 242. That is, a top surface of the guide pole 232 may be level with a top surface of the bottom plate 212. Accordingly, a heat-radiating pad 152 may be disposed horizontally on the top surface of the guide pole 232 and the entire surface of the bottom plate 212 with the exception of the embossing portion 242.

The heat-radiating pad 152 is disposed over the guide pole 232. In the present exemplary embodiment, a second through-hole 152a formed in the heat-radiating pad 152 overlaps the first through-hole 212a. That is, in the present exemplary embodiment the second through-hole 152a guides light toward an optical sensor 310, together with the guide pole 232.

In the present exemplary embodiment, an optical sensor PCB 300 is fixed to a bottom surface of the embossing portion 242. To this end, rotary coupling members 400 are fixed to first and second insertion grooves 300a and 212b in a direction from the optical sensor PCB 300 toward the embossing portion 242. The first insertion grooves 300a are formed in the optical sensor PCB 300, and the second insertion grooves 212b are formed in the bottom plate 212. Therefore, the rotary coupling members 400 are coupled to the first and second insertion grooves 300a and 212b in the direction from the optical sensor PCB 300 toward the embossing portion 242. Alternative exemplary embodiments include configurations wherein the optical sensor PCB 300 may be fixed to the bottom surface of the embossing portion 242 via various other means as would be apparent to one of ordinary skill in the art.

Figure 8:
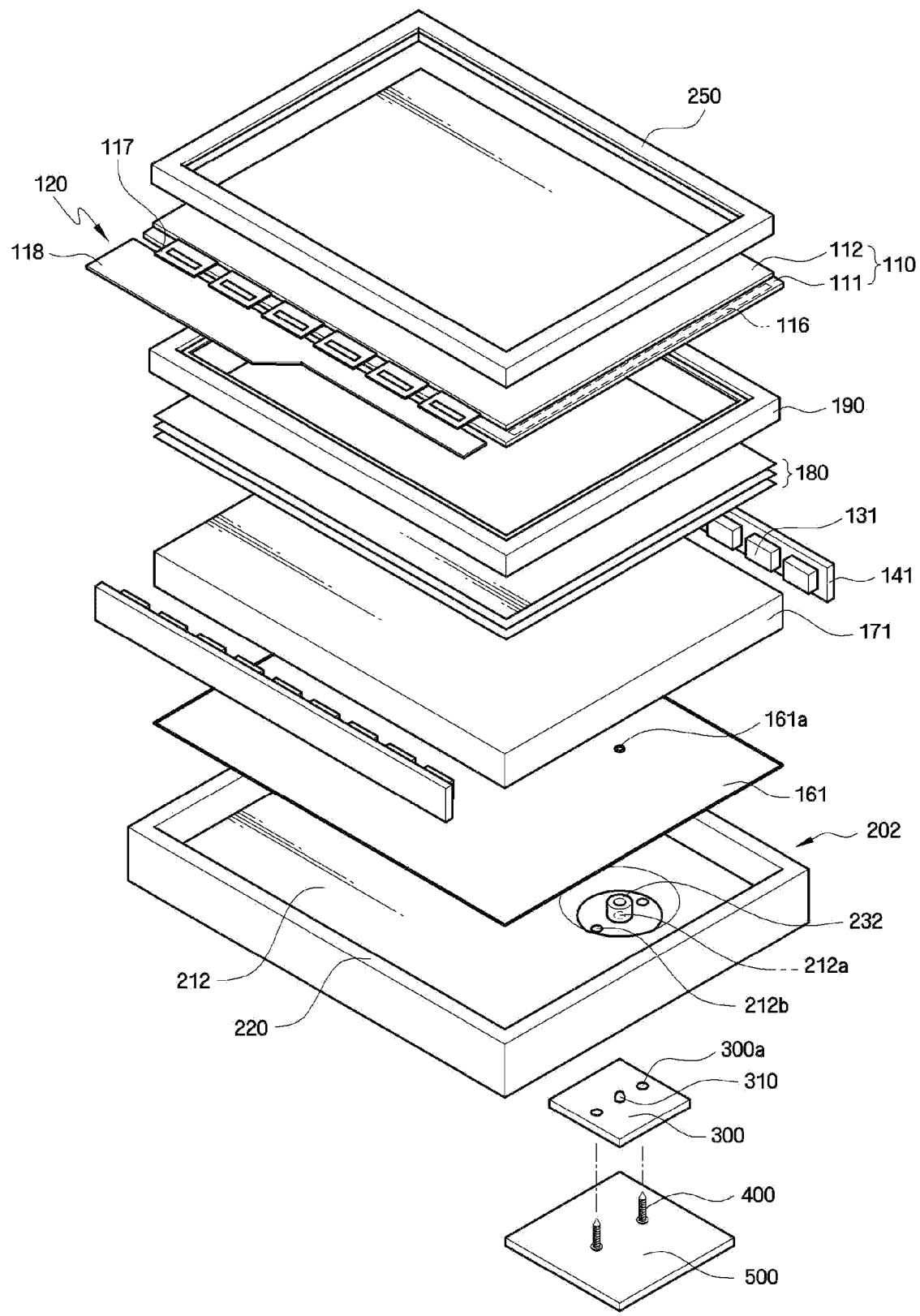
FIG. 8 is an exploded perspective view of a fourth exemplary embodiment of an LCD according to the present invention.

Hereinafter, a fourth exemplary embodiment of an LCD according to the present invention will be described in detail with reference to FIG. 8. FIG. 8 is an exploded perspective view of the fourth exemplary embodiment of an LCD according to the present invention.

Referring to FIG. 8, the present exemplary embodiment of an LCD is a combination of the second exemplary embodiment illustrated in FIG. 4 and the third exemplary embodiment illustrated in FIGS. 5 through 7. The present exemplary embodiment of an LCD is an edge-type LCD in which a plurality of light sources 131 is disposed at one or more sides of the LCD.

As in the third exemplary embodiment, in the present exemplary embodiment, an embossing portion 242 is formed in a bottom plate 212, and a first through-hole 212a and a guide pole 232 are formed in/on the embossing portion 242. A heat-radiating sheet may be omitted in the present exemplary embodiment, and a reflective sheet 161 is disposed over the guide pole 232 and the bottom plate 212.

Figure 9:
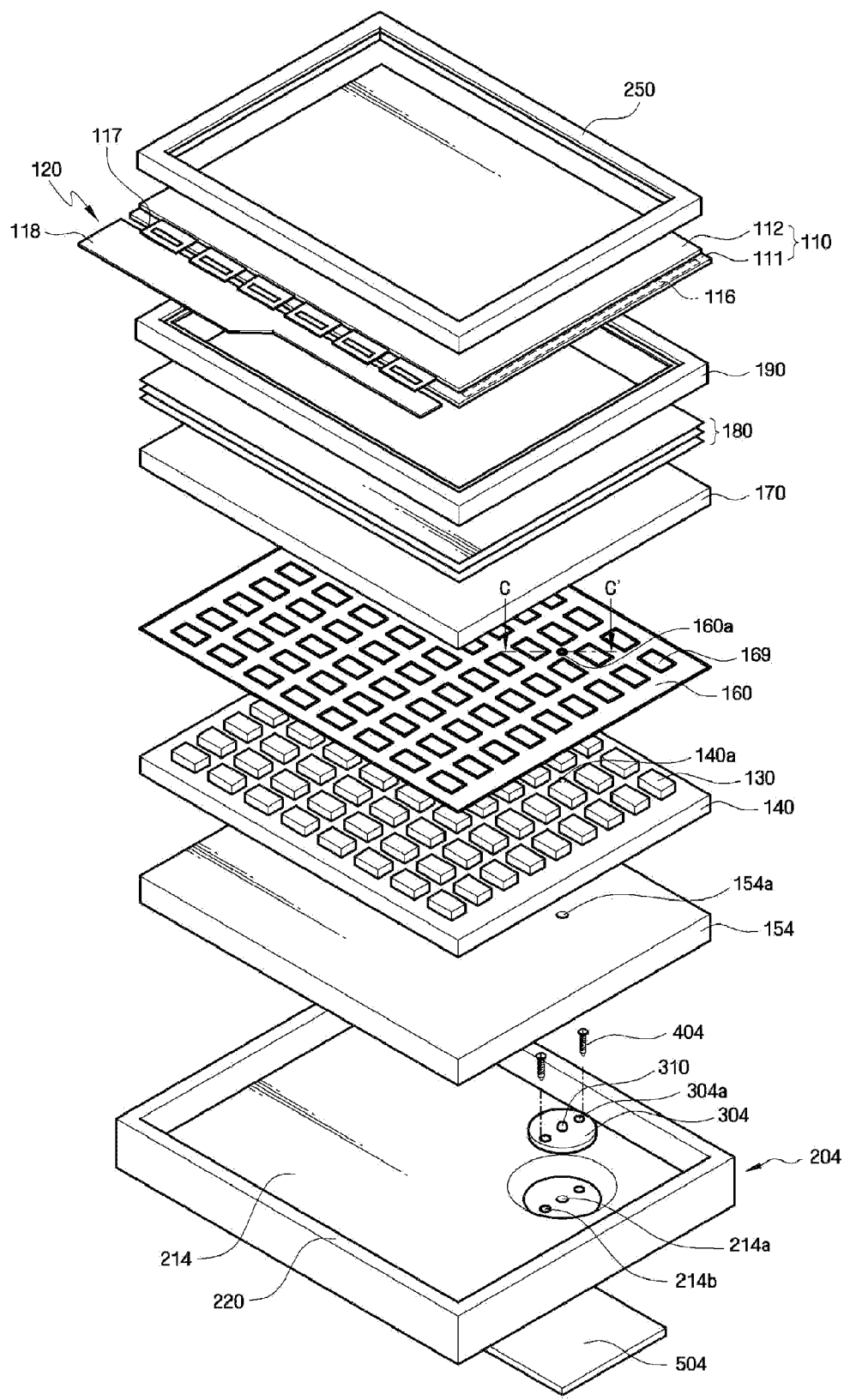
FIG. 9 is an exploded perspective view of a fifth exemplary embodiment of an LCD according to the present invention.
Figure 10:
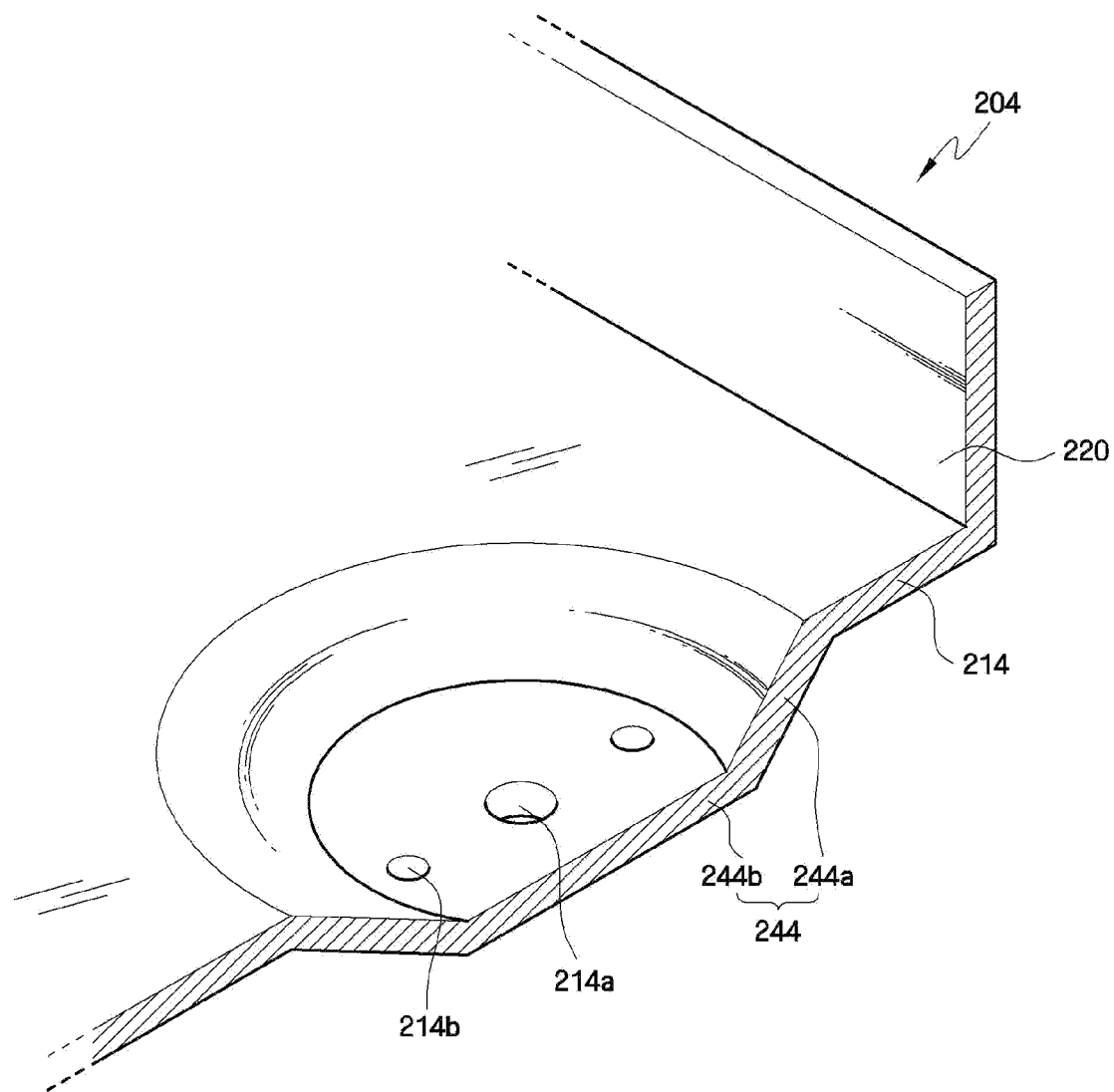
FIG. 10 is a partial perspective view of an exemplary embodiment of a lower receiving container included in the fifth exemplary embodiment of an LCD according to the present invention.
Figure 11:
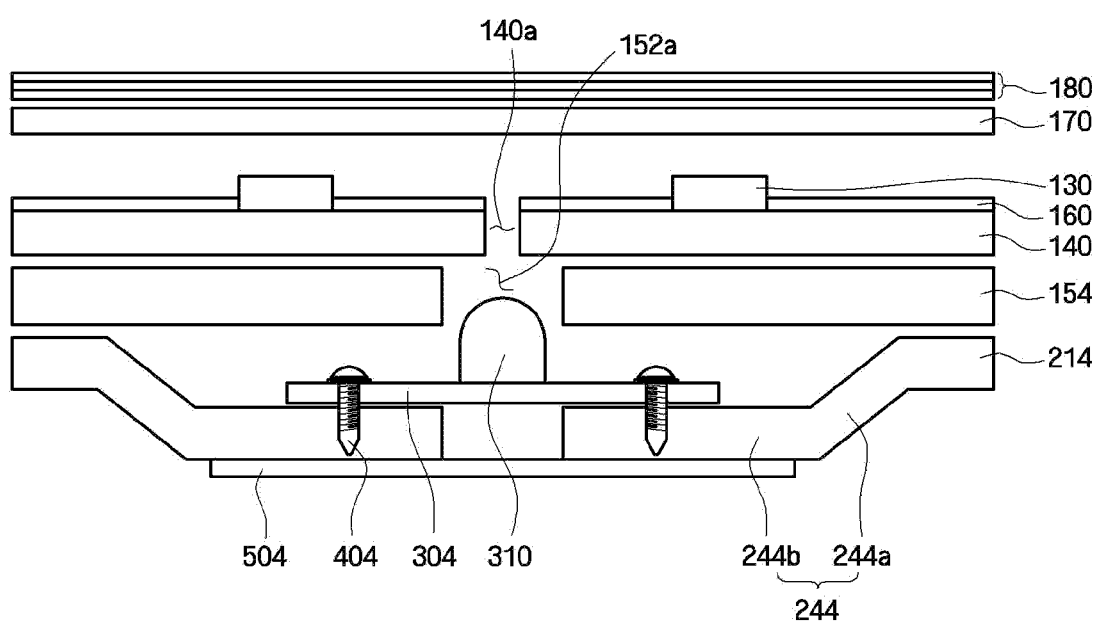
FIG. 11 is a cross-sectional view of the fifth exemplary embodiment of an LCD taken along line C-C' of FIG. 9.

Hereinafter, a fifth exemplary embodiment of an LCD according to the present invention will be described in detail with reference to FIGS. 9 through 11. FIG. 9 is an exploded perspective view of the fifth exemplary embodiment of an LCD according to the present invention. FIG. 10 is a partial perspective view of a lower receiving container 204 included in the fifth exemplary embodiment of an LCD according to the present invention. FIG. 11 is a cross-sectional view of the fifth exemplary embodiment of an LCD taken along line C-C' of FIG. 9.

Referring to FIGS. 9 and 10, the present exemplary embodiment of an LCD is of a direct type. In the present exemplary embodiment, an embossing portion 244 formed by protruding part of the lower receiving container 204 downward is provided. However, differing from the previous exemplary embodiments, in the present exemplary embodiment a guide pole is omitted.

The embossing portion 244 includes an inclined portion 244a which is formed by sloping part of a bottom plate 214 downward and a plate portion 244b which extends from the inclined portion 244a and has a flat surface substantially parallel to the bottom plate 214. A first through-hole 214a is formed in the plate portion 244b. A connector (not shown) is drawn out of the lower receiving container 204 through the first through-hole 214a and connects an optical sensor 310 to an external power source.

Referring to FIGS. 9 through 11, an optical sensor PCB 304 according to the present embodiment is disposed between the embossing portion 244 of the lower receiving container 204 and a heat-radiating pad 154. Specifically, the optical sensor PCB 304 according to the present embodiment is closely fixed to an inner side of the embossing portion 244. First insertion grooves 304a are formed in the optical sensor PCB 304, and second insertion grooves 214b are formed in the embossing portion 244. Therefore, the first and second insertion grooves 304a and 214b are coupled to rotary coupling members 404. The rotary coupling members 404 are coupled in a direction from the optical sensor PCB 304 toward the embossing portion 244. The optical sensor 310 is disposed on a top surface of the optical PCB 304. Alternative exemplary embodiments include configurations wherein the optical PCB 304 may be coupled to the embossing portion 244 via various other means as would be apparent to one of ordinary skill in the art. In one exemplary embodiment, a depth of the embossing portion 244 may be substantially equal to a thickness of the optical PCB 304 and that of an upper portion of each of the rotary coupling members 404.

The heat-radiating pad 154 is disposed on the bottom plate 214 and the rotary coupling members 404. A second through-hole 154a which overlaps the first through-hole 214a is formed in the heat-radiating pad 154. The optical sensor 310 is inserted into the second through-hole 154a. In addition, in the present exemplary embodiment an upper portion of the second through-hole 154a is disposed at a greater height than the optical sensor 310. Thus, light guided by the second through-hole 154a reaches the optical sensor 310.

A light-shielding film 504 is disposed under the embossing portion 244 to cover the first through-hole 214a. Thus, the light-shielding film 504 prevents light from an external source from entering the optical sensor 310. However, the light-shielding film 504 may be omitted when light can be sufficiently blocked by other components, such as the optical PCB 304.

Figure 12:
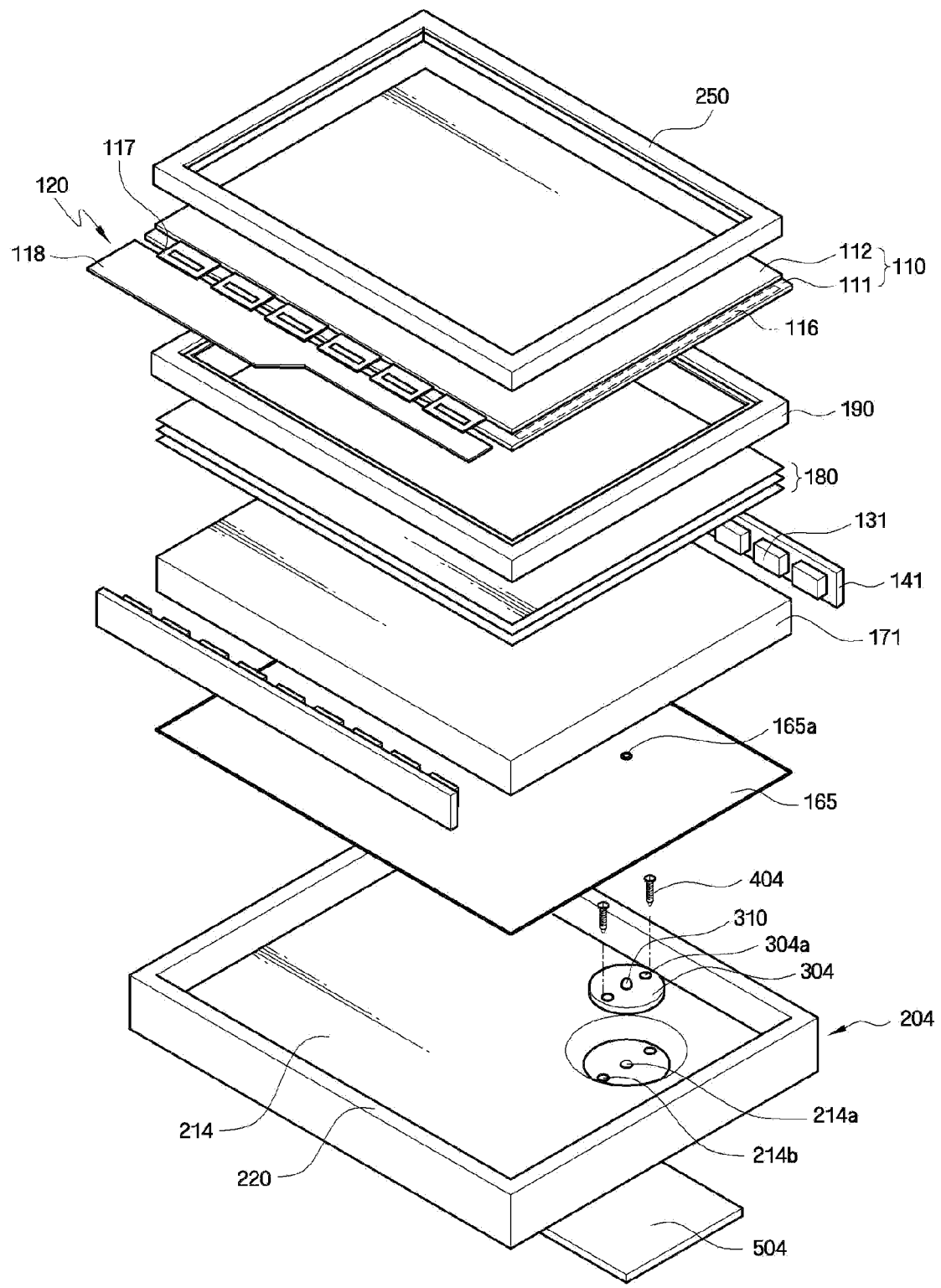
FIG. 12 is an exploded perspective view of a sixth exemplary embodiment of an LCD according to the present invention.

Hereinafter, a sixth exemplary embodiment of an LCD according to the present invention will be described in detail with reference to FIG. 12. FIG. 12 is an exploded perspective view of the sixth exemplary embodiment of an LCD according to the present invention.

Referring to FIG. 12, the present exemplary embodiment of an LCD is a combination of the second exemplary embodiment illustrated in FIG. 4 and the fifth exemplary embodiment illustrated in FIGS. 9 through 11.

The LCD according to the present embodiment is of an edge type, and a reflective sheet 165 is disposed above a bottom plate 214 and an upper portion of each of rotary coupling members 404.

The reflective sheet 165 according to the present exemplary embodiment may include a second light transmission hole 165a to allow light to be input directly to an optical sensor 310. In one exemplary embodiment, the second light transmission hole 165a may have a greater diameter than the optical sensor 310 to accommodate the optical sensor 310. In such an exemplary embodiment, light emitted from a plurality of light sources 131 may reach the second light transmission hole 165a via an LGP 171 or via the reflective sheet 165, optical sheets 180, and a liquid crystal panel 110. Light that passed through the second light transmission hole 165a reaches the optical sensor 310 disposed below.

However, alternative exemplary embodiments from the exemplary embodiment illustrated in the drawing include configurations wherein the second light transmission hole 165a may not be formed in the reflective sheet 165. In such an alternative exemplary embodiment, light emitted from the light sources 131 may pass through the reflective sheet 165 via the LGP 171 and reach the optical sensor 310, e.g., the reflective sheet 165 may not entirely reflect all of the light incident thereon, but instead may allow a fraction of the light incident thereon to pass therethrough. Here, the intensity of the light that reaches the optical sensor 310 may be lower than that of the light that reaches the optical sensor 310 when the second light transmission hole 165a is formed in the reflective sheet 165. However, the optical sensor 310 may detect the luminance and color coordinates of the light by calibrating the luminance and color coordinates of the light with reference values stored therein.

In one exemplary embodiment, the embossing portion 244 may have a depth sufficient to prevent the optical sensor 310 from protruding above the reflective sheet 165. That is, the optical sensor 310 according to the present embodiment may be disposed substantially parallel to the bottom plate 214.

Figure 13:
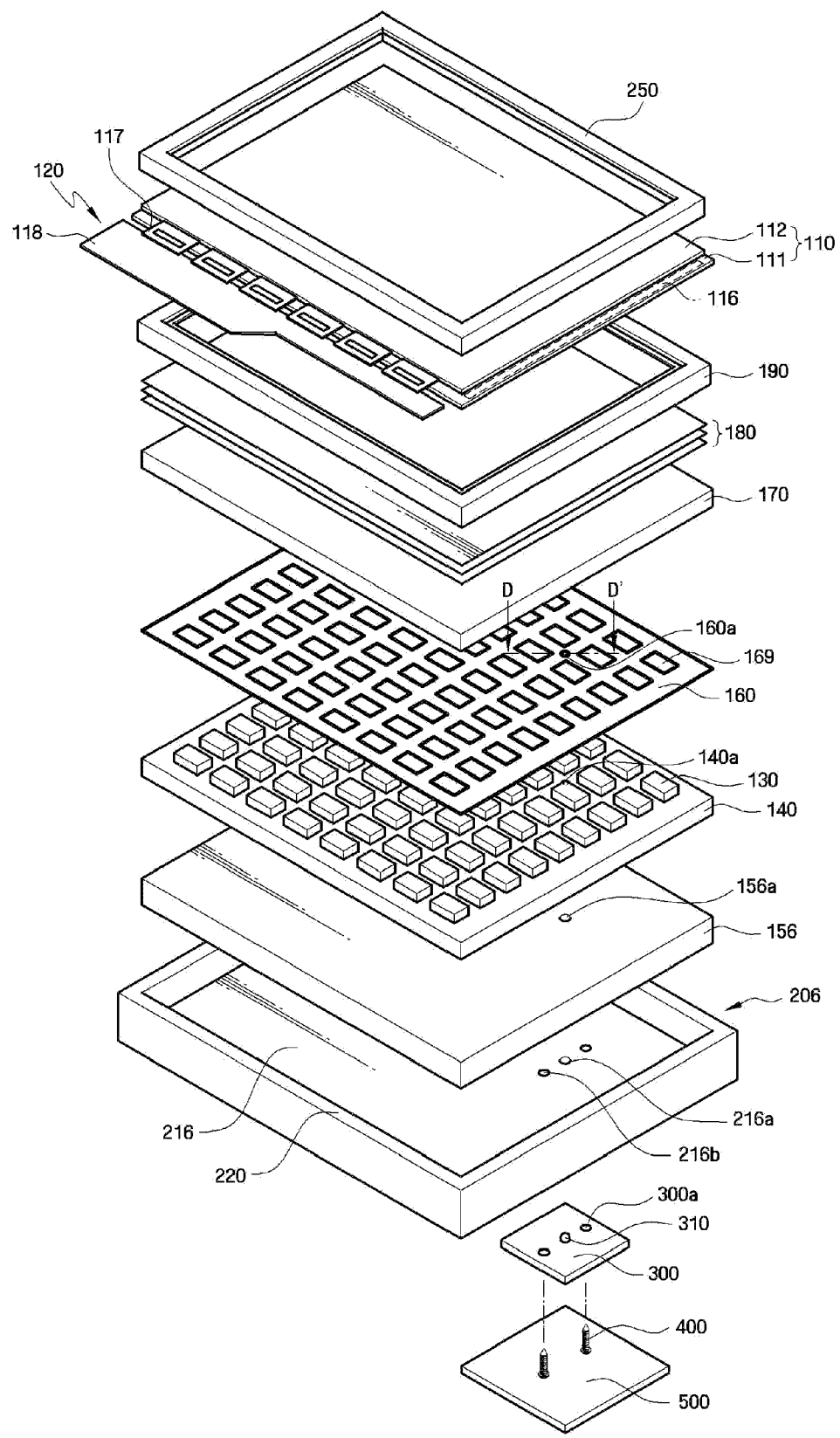
FIG. 13 is an exploded perspective view of a seventh exemplary embodiment of an LCD according to the present invention.
Figure 14:
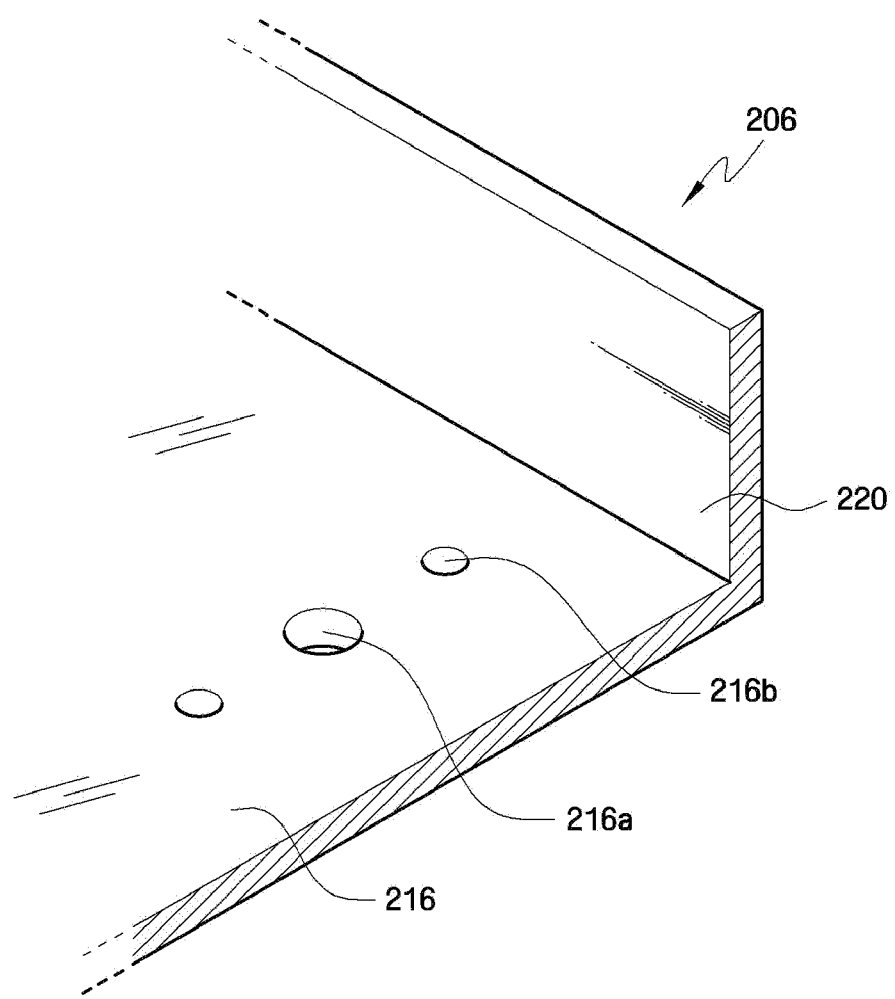
FIG. 14 is a partial perspective view of an exemplary embodiment of a lower receiving container included in the seventh exemplary embodiment of an LCD according to the present invention.
Figure 15:
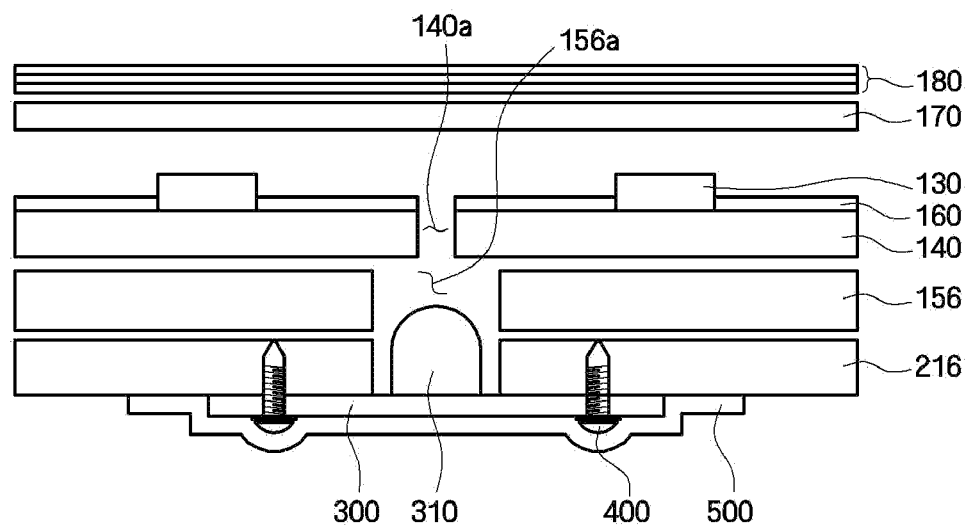
FIG. 15 is a cross-sectional view of the seventh exemplary embodiment of an LCD taken along line D-D' of FIG. 13.

Hereinafter, a seventh exemplary embodiment of an LCD according to the present invention will be described in detail with reference to FIGS. 13 through 15. FIG. 13 is an exploded perspective view of the seventh exemplary embodiment of an LCD according to the present invention. FIG. 14 is a partial perspective view of an exemplary embodiment of a lower receiving container 206 included in the seventh exemplary embodiment of an LCD according to the present invention. FIG. 15 is a cross-sectional view of the seventh exemplary embodiment of an LCD taken along line D-D' of FIG. 13.

Referring to FIGS. 13 and 14, the LCD according to the present exemplary embodiment may be of a direct type. The present exemplary embodiment of a lower receiving container 206 according to the present embodiment may omit an embossing portion but include a first through-hole 216a.

An optical sensor PCB 300 is closely attached to a bottom surface of a bottom plate 216 of the lower receiving container 206. An optical sensor 310 mounted on the optical sensor PCB 300 is inserted into the first through-hole 216a in an upward direction from under the lower receiving container 206. First insertion grooves 300a are formed in the optical sensor PCB 300, and second insertion grooves 216b are formed in the bottom plate 216. Therefore, the first and second insertion grooves 300a and 216b are coupled to rotary coupling members 400. The rotary coupling members 400 are coupled to the first and second insertion grooves 300a and 216b in a direction from the optical sensor PCB 300 toward the bottom plate 216. As discussed above, alternative exemplary embodiments may include alternative fixing means for attaching the optical sensor PCB 300 to the bottom surface of the bottom plate 216.

A heat-radiating pad 156 is disposed on the bottom plate 216 of the lower receiving container 206. A second through-hole 156a is formed in the heat-radiating pad 156 to overlap the first through-hole 216a. In one exemplary embodiment, the sum of heights of the first and second through-holes 216a and 156a is higher than a height of the optical sensor 310. The first and second through-holes 216a and 156a guide light emitted from a plurality of light sources 130 toward the optical sensor 310.

An alignment plate 140 having a first light transmission hole 140a is disposed on the heat-radiating pad 156. The first light transmission hole 140a is formed at a position corresponding to that of the first through-hole 216a. Other elements of the present exemplary embodiment are substantially identical to those of the first exemplary embodiment. For example, as in the first exemplary embodiment, the light sources 130 according to the present exemplary embodiment are formed on the alignment plate 140.

An exemplary embodiment wherein the first through-hole 216a is formed in the bottom plate 216 of the lower receiving container 206 has been described above as an example. However, the position of the first through-hole 216a is not limited thereto. That is, alternative exemplary embodiments include configurations wherein the first through-hole 216a may be formed in at least one of the sidewalls 220 of the lower receiving container 206. In such alternative exemplary embodiments, the first through-hole 216a may be formed in a portion of at least one of the sidewalls 220 which is located higher than the alignment plate 140. Accordingly, the optical sensor 310 and the optical sensor PCB 300 having the optical sensor 310 mounted thereon may be coupled to an outer side of one of the sidewalls 220. In addition, in order to completely block light from an external source, the optical sensor PCB 300 may be covered by a light-shielding film 500 which is disposed outside the sidewalls 200.

Figure 16:
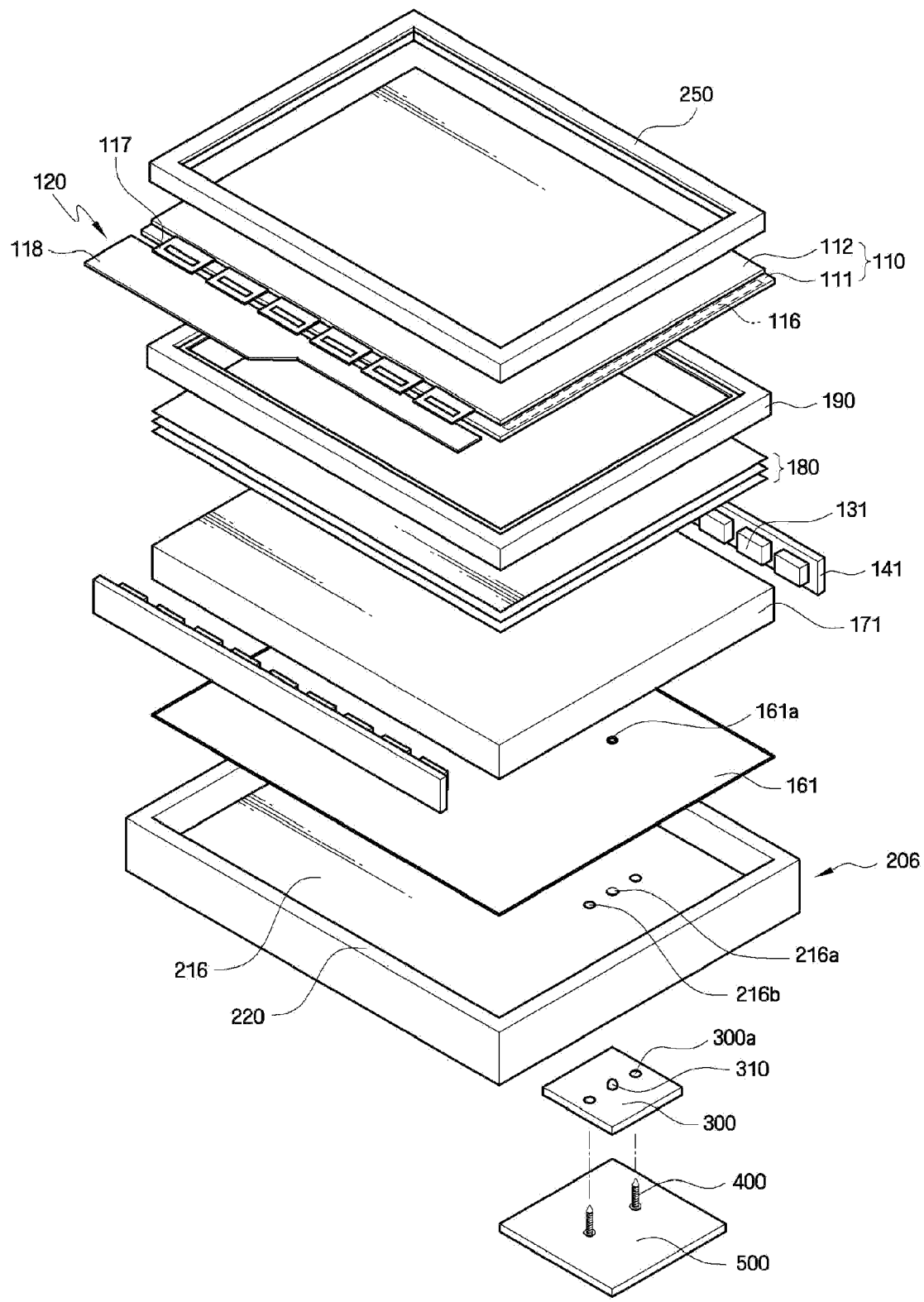
FIG. 16 is an exploded perspective view of an eight exemplary embodiment of an LCD according to the present invention.

Hereinafter, an eighth exemplary embodiment of an LCD according to the present invention will be described in detail with reference to FIG. 16. FIG. 16 is an exploded perspective view of the eighth exemplary embodiment of an LCD according to the present invention.

Referring to FIG. 16, the LCD according to the present embodiment is a combination of the second exemplary embodiment illustrated in FIG. 4 and the seventh exemplary embodiment illustrated in FIGS. 13 through 15. The LCD according to the present embodiment is of an edge type, and a heat-radiating pad (not shown) may form a path for guiding light toward an optical sensor 310. The positions of the heat-radiating pad 156 and a second through-hole (not shown) may be substantially identical to those according to the seventh exemplary embodiment of the present invention.

A first through-hole 216a according to the present embodiment may be formed in a bottom plate 216 or at least one of the sidewalls 220 of a lower receiving container 206. If the first through-hole 216a is formed in at least one of the sidewalls 220, a light-shielding film 500 may also be disposed on the corresponding the sidewalls 220 to block light, which is emitted from an external source, from entering the optical sensor 310 and an optical sensor PCB 300 having the optical sensor 300 mounted thereon. However, the first through-hole 216a, the optical sensor 310, the optical sensor PCB 300, and the light-shielding film 500 may be disposed on those of the sidewalls 220 where alignment plates 141 are not disposed in order not to block light that is input to the optical sensor 310 by the alignment plates 141.

Figure 17:
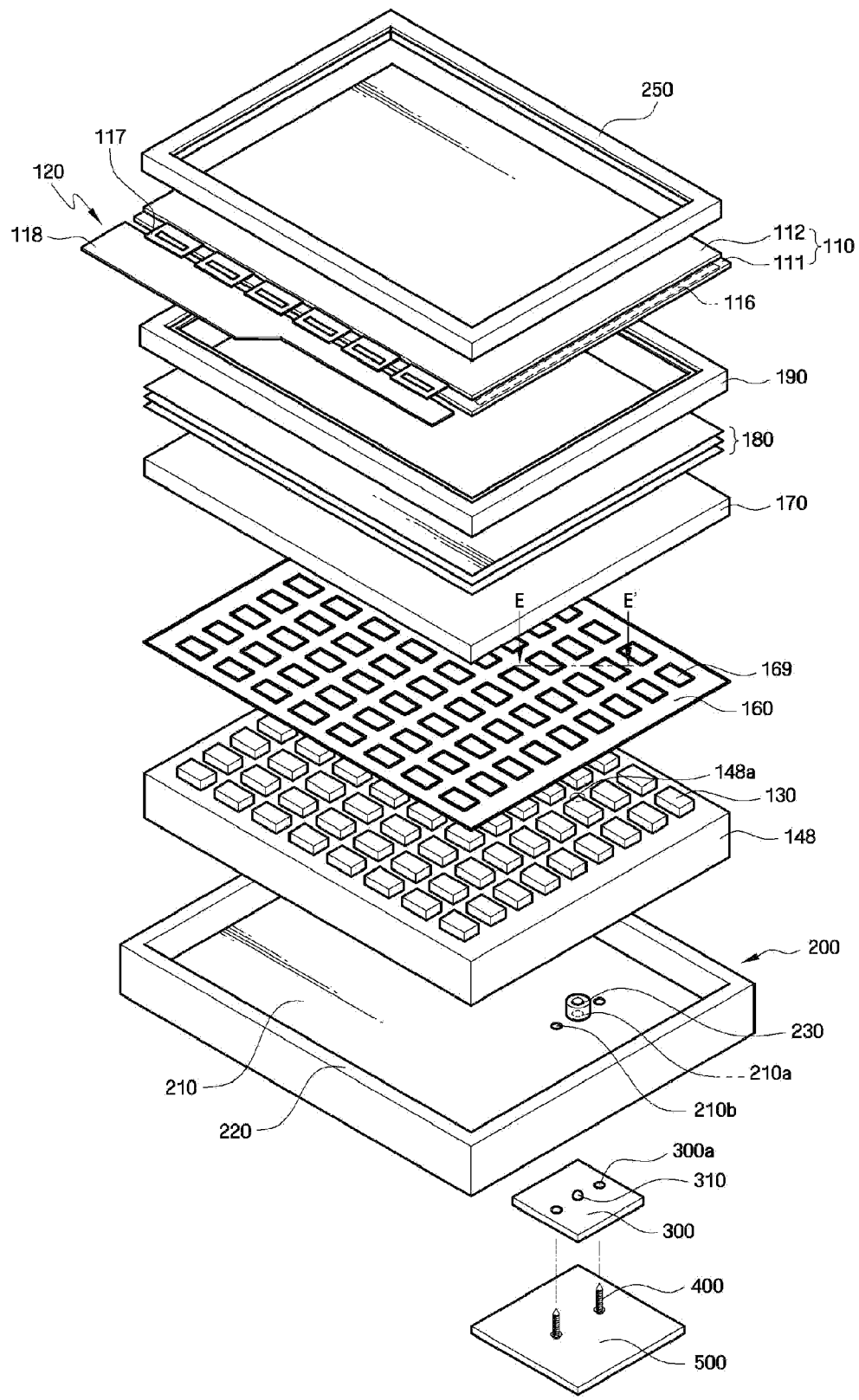
FIG. 17 is an exploded perspective view of a ninth exemplary embodiment of an LCD according to the present invention.
Figure 18:
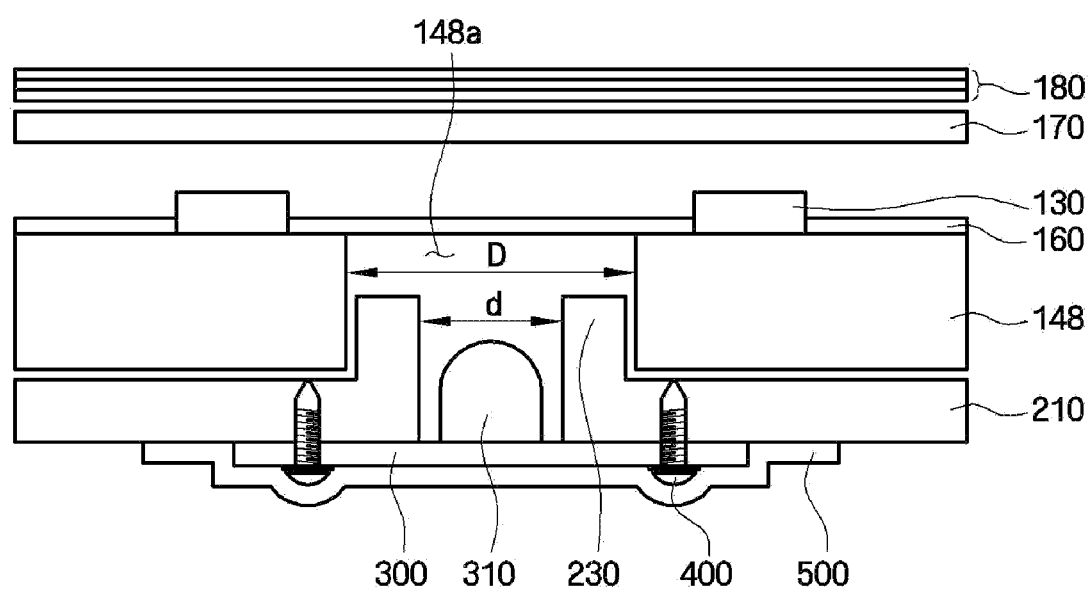
FIG. 18 is a cross-sectional view of the ninth exemplary embodiment of an LCD taken along line E-E' of FIG. 17.

Hereinafter, a ninth exemplary embodiment of an LCD according to the present invention will be described in detail with reference to FIGS. 17 and 18. FIG. 17 is an exploded perspective view of a ninth exemplary embodiment of an LCD according to the present invention. FIG. 18 is a cross-sectional view of the ninth exemplary embodiment of an LCD taken along line E-E' of FIG. 17.

Referring to FIGS. 17 and 18, the present exemplary embodiment of an LCD may omit a heat-radiating pad. Instead, the thickness of an alignment plate 148 may be increased to be larger than the height of the guide pole 230. In other words, the upper surface of the alignment plate 148 extends further from the bottom plate 210 than the guide pole 230.

The alignment plate 148 is disposed on the bottom plate 210. In one exemplary embodiment, the alignment plate 148 may be disposed directly on the bottom plate 210. The alignment plate 148 may include a second through-hole 148a located at a position corresponding to the first through-hole 210a. In one exemplary embodiment, the diameter D of the second through-hole 148a may be larger than the diameter d of the guide pole 230.

A reflective sheet 160, including light source-exposing grooves 169, may be disposed on the alignment plate 148. The reflective sheet 160 of the present embodiment does not include light transmission hole. Thus strong light emitted from the light sources 130 may be filtered through the reflective sheet 169 and be weakened thereby. Consequently the weak light is sensed by the optical sensor 310.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display comprising:
    a lower receiving container which comprises:
        a bottom plate;
        sidewalls extending from the bottom plate;
        a first through-hole formed in the bottom plate; and
        a guide pole disposed on the bottom plate and which substantially surrounds the first through-hole;
    a plurality of light sources disposed within the lower receiving container;
    an optical sensor printed circuit board attached to a bottom surface of the bottom plate, wherein the optical sensor printed circuit board covers the first through-hole; and
    an optical sensor mounted on the optical sensor printed circuit board and inserted into the first through-hole.

2. The liquid crystal display of claim 1, wherein the guide pole extends further from the bottom plate than the optical sensor.

3. The liquid crystal display of claim 1, further comprising a heat-radiating pad which is disposed on the bottom plate, wherein a second through-hole into which the guide pole is inserted is formed in the heat-radiating pad, and a height of the guide pole corresponds to a thickness of the heat-radiating pad.

4. The liquid crystal display of claim 1, wherein the optical sensor printed circuit board is coupled to the bottom plate by rotary coupling members which are inserted into the bottom plate in a direction from the optical sensor printed circuit board towards the bottom plate.

5. The liquid crystal display of claim 1, further comprising a light-shielding film which covers the optical sensor printed circuit board and at least a portion of the bottom surface of the bottom plate.

6. The liquid crystal display of claim 1, wherein the bottom plate comprises an embossing portion which protrudes in a direction substantially opposite to a plane on which the plurality of light sources are disposed, and the guide pole is disposed on the embossing portion.

7. The liquid crystal display of claim 6, wherein a height of the guide pole is substantially equal to a depth of the embossing portion.

8. The liquid crystal display of claim 6, further comprising a heat-radiating pad disposed over the guide pole, and a second through-hole, which overlaps the first through-hole, is formed in the heat-radiating pad.

9. The liquid crystal display of claim 1, further comprising an alignment plate disposed on the bottom plate and has a first light transmission hole located at a position aligned with that of the first through-hole, wherein the light sources are a plurality of point light sources and arranged on the alignment plate.

10. The liquid crystal display of claim 9, further comprising a reflective sheet disposed on the alignment plate, which has light source-exposing grooves exposing the light sources, and which has a second light transmission hole allowing light to be input to the optical sensor.

11. The liquid crystal display of claim 1, further comprising a light guide plate disposed on the bottom plate, an alignment plate disposed on at least one side of the light guide plate, and a reflective sheet which is disposed under the light guide plate, wherein the light sources are point light sources arranged on the alignment plate.

12. A liquid crystal display comprising:
    a lower receiving container which comprises:
        a bottom plate having an embossing portion
        sidewalls extending in a first direction from the bottom plate and
        a first through-hole formed in the embossing portion, wherein the embossing portion protrudes from the bottom plate in a second direction substantially opposite to the first direction;
    a plurality of light sources disposed within the lower receiving container;
    an optical sensor printed circuit board attached to the embossing portion, wherein the optical sensor printed circuit board covers the first through-hole within the lower receiving container; and
    an optical sensor mounted on the optical sensor printed circuit board.

13. The liquid crystal display of claim 12, further comprising a heat-radiating pad disposed on the bottom plate, wherein a second through-hole into which the optical sensor is inserted is formed in the heat-radiating pad.

14. The liquid crystal display of claim 13, wherein an upper portion of the second through-hole extends further from the bottom plate than the optical sensor.

15. The liquid crystal display of claim 13, wherein the optical sensor printed circuit board is disposed between the embossing portion and the heat-radiating pad, and the optical sensor printed circuit board is coupled to the embossing portion by rotary coupling members which are inserted into the embossing portion in a direction from the optical sensor printed circuit board towards the bottom plate.

16. The liquid crystal display of claim 12, further comprising an alignment plate disposed on the bottom plate and which has a first light transmission hole aligned with the first through-hole, wherein the light sources are a plurality of point light sources arranged on the alignment plate.

17. The liquid crystal display of claim 12, further comprising:
    a light guide plate disposed on the bottom plate;
    an alignment plate disposed on at least one side of the light guide plate; and;
    a reflective sheet disposed under the light guide plate,
    wherein the light sources are point light sources arranged on the alignment plate.

18. A liquid crystal display comprising:
    a lower receiving container which comprises:
        a bottom plate; and sidewalls disposed on the bottom plate and which surround edges of the bottom plate;
a first through-hole formed through the lower receiving container;
a plurality of light sources disposed within the lower receiving container;
an optical sensor printed circuit board attached to a bottom surface of the bottom plate, wherein the optical sensor printed circuit board covers the first through-hole;
an optical sensor mounted on the optical sensor printed circuit board and inserted into the first through-hole; and
a light-shielding film disposed under the bottom plate and which covers the optical sensor printed circuit board and covers less than an entire portion of the bottom plate.

19. The liquid crystal display of claim 18, wherein the first through-hole is formed in the bottom plate.

20. The liquid crystal display of claim 19, further comprising a heat-radiating pad disposed on the bottom plate, wherein a second through-hole is formed in the heat-radiating pad to overlap the first through-hole.

21. The liquid crystal display of claim 20, wherein a sum of the extensions of the first and second through-holes in a first direction substantially perpendicular to the bottom plate is substantially longer than an extension of the optical sensor in the first direction.

22. The liquid crystal display of claim 19, further comprising an alignment plate disposed on the bottom plate and which has a first light transmission hole aligned with the first through-hole, wherein the light sources are a plurality of point light sources arranged on the alignment plate.

23. The liquid crystal display of claim 22, further comprising a reflective sheet disposed on the alignment plate, wherein the reflective sheet has light source exposing grooves which expose the light sources, and wherein the reflective sheet has a second light transmission hole allowing light to be input to the optical sensor.

24. The liquid crystal display of claim 18, wherein the first through-hole is formed in at least one of the sidewalls.

25. The liquid crystal display of claim 18, further comprising a light guide plate disposed on the bottom plate, an alignment plate disposed on at least one side of the light guide plate, and a reflective sheet disposed under the light guide plate, wherein the light sources are point light sources arranged on the alignment plate.

26. A liquid crystal display comprising:
a lower receiving container which comprises:
a bottom plate;
sidewalls extending from the bottom plate;
a first through-hole formed in the bottom plate; and
a guide pole disposed on the bottom plate and which substantially surrounds the first through-hole;
a plurality of light sources disposed within the lower receiving container;
an optical sensor printed circuit board attached to a bottom surface of the bottom plate, wherein the optical sensor printed circuit board covers the first through-hole;
an optical sensor mounted on the optical sensor printed circuit board and inserted into the first through-hole;
an alignment plate disposed on the bottom plate and which includes a second through-hole located at a position aligned with the first through-hole; and
wherein an upper surface of the alignment plate extends further from the bottom plate than an upper surface of the guide pole.

27. The liquid crystal display of claim 26, further comprising a reflective sheet disposed on the alignment plate, which covers the second through-hole.

28. The liquid crystal display of claim 26, wherein a diameter of the second through-hole is larger than a diameter of the guide pole.

* * * * *